United States Patent Office 3,126,274
Patented Mar. 24, 1964

3,126,274
PROCESS FOR REDUCTION SMELTING OF SILICEOUS ORES AND SLAGS BY USE OF CALCIUM CARBIDE
Olav C. Aamot, deceased, late of Lewiston, N.Y., by Richard O. Aamot, administrator, Niagara Falls, N.Y., assignor, by mesne assignments, to Independence Foundation, Philadelphia, Pa., and Koppers Company, Inc., Pittsburgh, Pa., both corporations of Delaware
No Drawing. Filed Mar. 16, 1961, Ser. No. 96,637
2 Claims. (Cl. 75—24)

This invention relates to metallurgy in general and to the smelting of easily fusible siliceous ores and slags in particular. The invention has for a principal object the provision of an efficient and economic process for the smelting of easily fusible siliceous ores and slags of the general type containing the occurrence, $FeO \cdot SiO_2$, including fayalite, rhodonite, garnet, spessartite, almandite, copper reverberatory furnace slags, power plant boiler waste, or similar, easily fusible, manganese-bearing ores and slags of the siliceous type.

It is well established in the art of electric furnace smelting of slags that specific power consumption will decrease as the smelting rate is increased. Basically, this means that from an efficiency stand-point, faster smelting and reduction is most desirable. There are several factors, however, which mitigate against this objective. Initially, the investment in a smelting furnace with larger transformers and electrodes is substantially higher, and delay time, such as the interval between charges, is also more costly as power must be paid for whether used or not. The addition of a new charge is bound to cool the furnace lining and, even with a high power input, considerable time will be taken to get both the charge and the lining up to operating temperature. During this time, the slag suffers maximum heat loss to the lining due to the circulation of the slag from the center to the walls and back. Also, substantial quantities of lime must be added to acid slags, and a large quantity of heat is required to take this into solution. These factors, along with the normally poor reduction contact of coke floating on top of the slag, all tend to lower the efficiency of slag reduction and smelting, as compared to normal types of iron ore. Due to heat losses through the lining, it has been found in practice that power consumption, in kilowatt hours per ton of slag produced at 1400° C., is very nearly the same whether one starts with a cold charge or a molten one at 1200° C.

The foregoing general considerations apply with special force to the smelting of $FeO \cdot SiO_2$-type ores and slags, as in the past, processes for their reduction have been uniformly slow, with proportionally high-power consumption and low-heat efficiency.

The smelting of these slags with supernatant carbon is one such process, and is generally attempted with molten slags taken directly from a copper reverberatory furnace. The slag is delivered at about 1200° C. and must be heated up to about 1400° C. before reaction with the carbon gets underway—and the heat losses during this period are at a maximum. Other problems commonly associated with smelting slags in this manner are that the slags are normally acid, which are highly wearing on basic furnace linings, and if the furnace is provided with a carbon lining, the FeO content of the slags tends to oxidize this material.

One method of alleviating these problems and raising the efficiency of the smelting process is to utilize calcium carbide as a reductant, thereby taking advantage of the fast, exothermic reaction—

$$CaC_2 + 3(FeO \cdot SiO_2) = CaO(SiO_2)_3 + 3Fe + 2CO \quad (Eq. I)$$

This has been tried in the past, in a process in which lime and carbon are charged onto the top of a bath of liquid slag. The electrodes are put in arcing contact with the lime-carbon mixture, resulting in the in situ production of calcium carbide, which sinks into the iron slag as it is produced. The heat resulting from the reduction reaction speeds the general reaction rate somewhat, but it is still inherently slow, as the carbide can only be consumed as fast as it is produced.

In a somewhat similar process, supernatant carbon is used as the principal reductant, but a sufficient quantity of lime is added so that a carbide slag is formed which assists in the reduction. Again, this is a time consuming operation which substantially boosts power consumption. In both processes, lime consumption per ton of metal produced is necessarily high.

In essence, the process of the present invention is based on the initial production of calcium carbide in a suitably designed furnace, after which molten fayalite slag, or the like, is run into the furnace and over the carbide; resulting in an immediate reaction which will complete the reduction of iron in a very short time, after which most of the iron free slag is tapped out and, after a certain interval, a new batch of slag is run in. The iron, which collects on the bottom, is tapped out periodically.

Many advantages are obtained by operating in accordance with the principles of my invention, including, by way of illustration: (1) the manufacture of calcium carbide, which takes place primarily in the solid state, is highly efficient; furnace efficiencies of above 70% being common; (2) electric power is used continuously during the carbide manufacture, and there is less need of power during slag reduction, which further increases efficiency; (3) one furnace is used for both steps, so that the furnace becomes a heat sink; (4) the left over slag becomes highly basic, and along with protective layers of pig iron, carbide and hot lime, serves to protect the carbon hearth from the incoming acid slag; (5) desulfurization is very rapid and efficient, as calcium carbide is as good a desulfurizer as is known, and the basic slag absorbs sulfur; and (6) as the reaction is exceptionally fast, the outgoing slag need not be too high in lime, so lime consumption will not be high although desulfurization will still be highly efficient.

In operation, an elongated furnace with tapping and charging ports at either end is to be preferred, although any suitable furnace can be employed. Such an elongated furnace is advantageously equipped so as to tilt slightly toward either end, thereby facilitating contact of the incoming slag with the molten carbide. As the reaction is very fast, by the time the slag reaches the far end of the furnace, the contained iron values are substantially reduced. Also, a gentle rocking motion may be used to speed or slow down the reaction. Furnace electrodes, used mostly during the carbide producing phase, are preferably positioned in a straight line or a flattened triangle.

The calcium carbide is made from a charge containing excess lime in the conventional manner and allowed to accumulate on the carbon hearth at temperatures of the order of 1400° to 1700° C. The cooler but still molten iron slag is then poured into one end of the furnace, and the reaction of Equation 1 goes to completion, with the lime substituting for the iron as it is reduced out, leaving a low-basicity calcium silicate slag. It is to be noted that the further solution of lime takes more time than the iron reduction, so the iron slag need not be too highly neutralized with lime before it leaves the furnace through a suitable slag tap hole. A certain amount of slag should be left in the furnace between heats, as this acts to moderate the exothermic reaction to a certain degree. After the reduction, the basic slag left in the furnace also acts to further desulfurize the reduced iron, while at the same time some carbon goes into the iron as carbide. In this way, the exothermic reaction is carried out under the cover of the deep charge bed, to facilitate safe gas removal under a porous, flexible cover.

In the interval between charges of slag, the furnace is operated as a carbide furnace, and production is geared to the amount of slag produced each day, so that processing may be continuous. Since carbide production is carried out at a high temperature, carbons of the less reactive type, such as petroleum coke or anthracite, are perfectly suitable for use in the process.

Consumption of power, in terms of kilowatt-hours per ton of iron produced, is quite low. While it takes somewhat less than 4000 kw. hr. to produce a metric ton of pure calcium carbide, according to Equation 1, one part of $CaC_2$ will reduce 2.77 parts of FeO, so that theoretically a ton of pig iron can be produced for approximately 1400 kw. hr. per metric ton. It is assumed in this connection that the exothermic heat of reaction will be sufficient to raise the temperature of the incoming slag to that of the reduced, outgoing slag, and to compensate for normal furnace heat losses. While some additional heat is produced by $SiO_2$ reacting with CaO, a certain amount of heat is also lost by carbon dissolving in the iron as iron carbide.

Close metallurgical control of the reduction process, in terms of a metered influx of slag into the furnace, leaving a certain amount of slag in the furnace, and controlled agitation of the melt by gently rocking the furnace (i.e., tilting type), serve to moderate the speed of the exothermic reaction, thereby preventing the slag from foaming in the furnace and slowing the evolution of the gas (CO) which is produced. Where low grade carbon such as petroleum coke is used in the carbide production, it is also necessary to keep sulfur from building up in the slag to a point where it would contaminate the iron. This can be accomplished either by discarding the slag altogether, or by the use of enough lime to maintain a base:acid ratio of about 0.7:1.

While the foregoing description concerns slags of the general $FeO \cdot SiO_2$ composition for purposes of illustration, it is to be emphasized that the invention may be used also in conjunction with the reduction of $MnO \cdot SiO_2$-type compositions to produce ferromanganese or manganese, or any other siliceous mineral compositions, natural or man-made, in which the desired metallic component may be exothermically reduced with calcium carbide.

It is believed that the invention may be best understood by reference to the following specific example illustrating the application of the foregoing principles and procedures to the reduction of a typical siliceous material:

*Example*

A deep-hearth, oval shaped furnace with a carbon lining and rated at 3600 kw. was used for the trial. This furnace is normally used to produce approximately 1 metric ton of standard grade calcium carbide per hour. For the purpose of practicing the present invention, tapholes were installed at each of the oval ends of the furnace in addition to the centrally located carbide taphole. Also, the furnace was mounted on rockers capable of tilting the entire structure 10° above or below the horizontal line.

Carbide production was commenced in the conventional manner with an excess of lime, and with approximately 1 ton of carbide in the hearth about 3 tons of molten (1250° C.) ferrosilicate slag were poured slowly into one end of the furnace. The charge cut its way through the charge bed of carbide as pouring continued, and a copious evolution of carbon monoxide gas was observed, indicating the progress of the exothermic reaction. After about 15 minutes, gas evolution subsided and the furnace was slowly tilted about 5° toward the other end, and the slag taphole was opened. About 1½ tons of a fluid calcium silicate slag were tapped out, leaving an estimated ½ ton of slag in the furnace. Analyses of the incoming and outgoing slags were as follows:

| Incoming | | Outgoing | |
|---|---|---|---|
| Fe | 42.0%=53.7% FeO | Fe | 0.8%=1.03% FeO |
| $SiO_2$ | 33.0% | $SiO_2$ | 46.4% |
| $Al_2O_3$ | 10.4% | $Al_2O_3$ | 15.1% |
| CaO | 1.7% | CaO | 34.0% |
| MgO | 1.2% | MgO | 1.8% |
| Cu | 0.07% | Cu | 0.01% |
| Zn | 0.17% | Zn | trace |
| S | 0.51% | S | 0.68% |

The slag was calculated to have taken up about 0.26 ton of CaO from the burden, and about 0.46 ton of calcium carbide were used.

The burden was readjusted for lime, to take care of the CaO requirement noted above. Carbide production was resumed and carried on for about ½ hour, and then a new charge of 3 tons of ferrosilicate slag was poured slowly into the feed end of the furnace. After the exothermic reaction had subsided, about 2 tons of slag were tapped, and it was noted that this slag was slightly more basic than the first, and was found to have some carbide content—determined by reacting a sample with water.

After an additional ½ hour of carbide production, the center taphole was opened and approximately 2 tons of pig iron were tapped out. This iron contained the following:

|   | Percent |
|---|---|
| C | 4.1 |
| S | 0.02 |
| Si | 1.5 |

The iron also contained a little copper, but no zinc and no calcium. After the metal tap, it was estimated that the furnace still contained about ½ ton of pig iron and ½ ton of residual basic slag. The slag would have a considerable amount of carbide dissolved in it, but this would act to further desulfurize the pig iron and would be eliminated by reaction when a new quantity of acid ferrosilicate slag was charged. Zinc was removed as fume with the carbon monoxide gas, and almost all of the copper contained in the slag was reported in the pig iron. It was observed that the presence of some highly basic "buffer" slag in the furnace tended to moderate the violence of the exothermic reaction which takes place on charging, and it undoubtedly also protects the furnace lining.

Having thus described the subject matter of my invention, what it is desired to secure by Letters Patent is:

1. In a process for the reduction smelting of siliceous ores and slags employing a calcium carbide reductant, the improvements that comprise,
   (a) establishing a bath of calcium carbide within a smelting vessel;
   (b) charging said ore or slag in a molten condition directly onto the surface of said calcium carbide, thereby rapidly reducing said ore or slag and resulting in the formation of a metallic phase and a waste slag phase; and
   (c) removing and separating said metallic phase and said slag phase.

2. In a process for the reduction smelting of siliceous ores and slags employing a calcium carbide reductant, the improvements that comprise,
   (a) charging a smelting furnace with a mixture of lime and carbonaceous material;
   (b) smelting said mixture to effect the production of molten calcium carbide at a temperature within the range of 1400° C. to 1700° C.
   (c) charging said ore or slag in a molten condition directly onto the surface of said molten calcium carbide, thereby rapidly reducing said ore or slag and resulting in the formation of a metallic phase and a calcium silicate slag phase; and (d) periodically removing and separating said metallic phase and said slag phase.

References Cited in the file of this patent

UNITED STATES PATENTS

| 891,563 | Price et al. | June 23, 1908 |
| 2,523,092 | Bryk et al. | Sept. 19, 1950 |
| 2,775,518 | Udy | Dec. 25, 1956 |